United States Patent
Sui

(12) 
(10) Patent No.: US 6,594,068 B2
(45) Date of Patent: Jul. 15, 2003

(54) HIGH SWITCHING SPEED DIGITAL FARADAY ROTATOR DEVICE AND OPTICAL SWITCHES CONTAINING THE SAME

(76) Inventor: Zhifeng Sui, 41706 Covington Dr., Fremont, CA (US) 94539

( * ) Notice: Subject to any disclaimer, the term of this patent is extended or adjusted under 35 U.S.C. 154(b) by 0 days.

(21) Appl. No.: 09/784,703

(22) Filed: Feb. 14, 2001

(65) Prior Publication Data

US 2002/0003651 A1 Jan. 10, 2002

Related U.S. Application Data

(60) Provisional application No. 60/216,056, filed on Jul. 5, 2000.

(51) Int. Cl.[7] .............................. G02F 1/09; G02F 1/00; G02B 5/30; H01J 40/14; G01R 33/02
(52) U.S. Cl. ..................... 359/280; 359/281; 359/324; 359/484; 250/222.14; 324/244.1; 372/33
(58) Field of Search ................................. 359/256, 280, 359/281, 282, 321, 324, 484, 495, 496, 497; 324/205, 244.1; 250/227.14; 372/33, 26, 37, 703

(56) References Cited

U.S. PATENT DOCUMENTS

| | | | | |
|---|---|---|---|---|
| 4,563,236 A | * | 1/1986 | Ross et al. ................... 324/205 |
| 5,521,741 A | * | 5/1996 | Umezawa et al. ........... 359/246 |
| 5,801,875 A | * | 9/1998 | Brandle, Jr. et al. ......... 359/321 |
| 5,898,516 A | * | 4/1999 | Shirai et al. ................. 359/324 |
| 6,360,034 B1 | * | 3/2002 | Chang .......................... 385/18 |

* cited by examiner

*Primary Examiner*—Georgia Epps
*Assistant Examiner*—Gary O'Neill
(74) *Attorney, Agent, or Firm*—Bo-In Lin

(57) ABSTRACT

In all-optical networks, high speed optical switching and routing becomes one of the most important issues for interconnecting the transport network layers. This invention describes novel polarization-independent high speed optical switches using a digital Faraday rotator, which can also be used for various other optical switching devices. The basic digital Faraday rotator device is composed of (a) a semi-hard or hard iron garnet based magneto-optic crystal having bi-stable magnetization states at zero external magnetic field. (b) a wire winding around the crystal for changing the magnetization states by pulsed current having both fast rise time and short duration. (c) a circuit generating the required current pulses with both polarities. After a driving current pulse excitation to set the magnetization direction, the high coercive force and high remnant squareness in the garnet-based crystal will maintain the saturation magnetization state in the crystal without the need of any external current or magnetic field to sustain the remnant state. The apparatus and the method disclosed in this invention effectively reduces the overall power consumption. By using this digital Faraday rotator device, the polarization independent 1×2 and 2×2 optical switches are designed and fabricated.

28 Claims, 12 Drawing Sheets

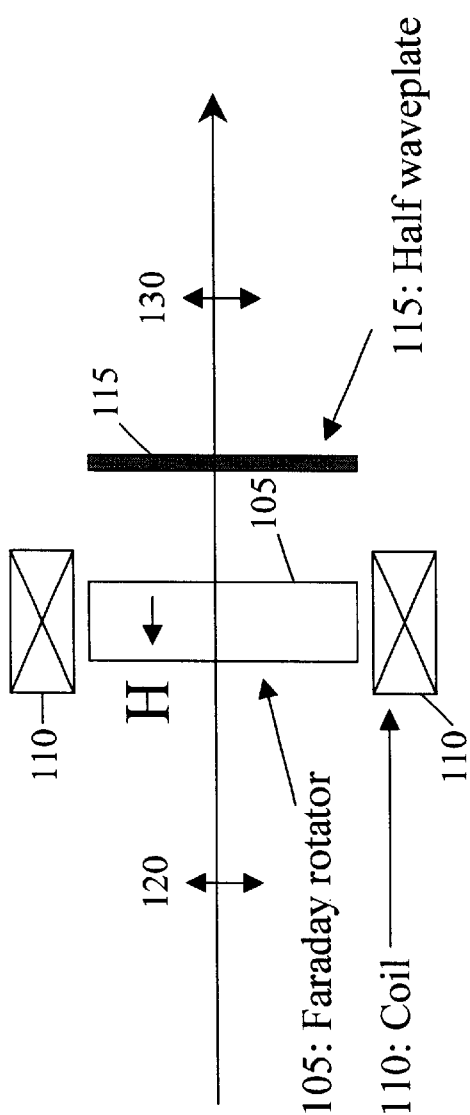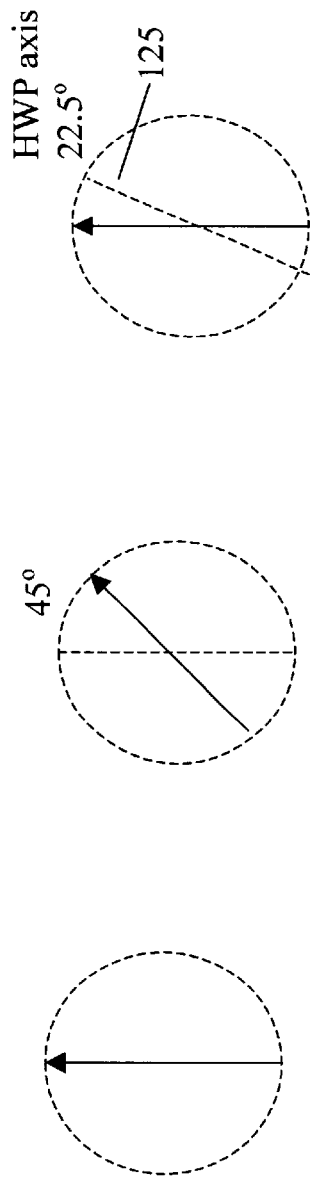
Fig. 1A
Fig. 2A-1 Incoming Polarization
Fig. 2A-2 Polarization left-handed rotated 45°
Fig. 2A-3 Polarization after half waveplate

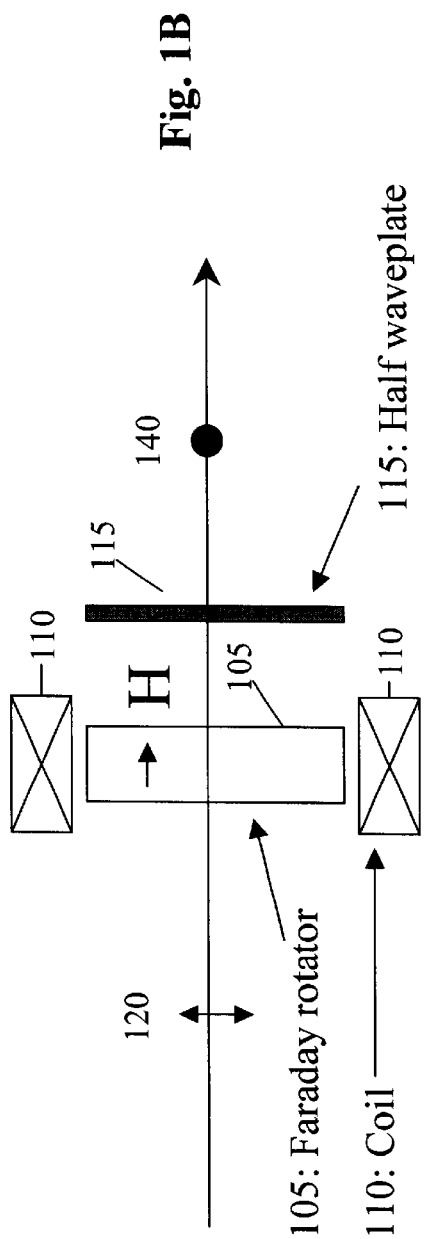
Fig. 1B
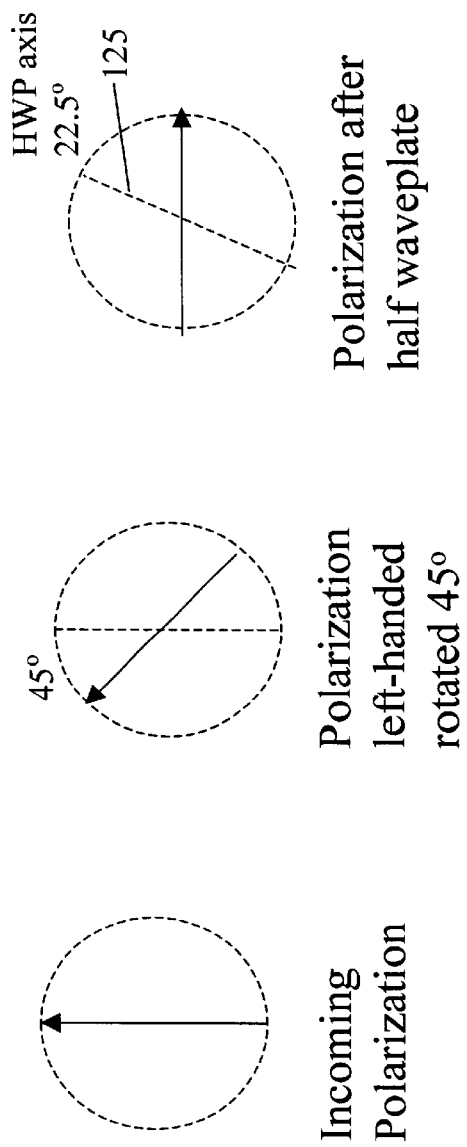
Fig. 2B-3 Polarization after half waveplate
Fig. 2B-2 Polarization left-handed rotated 45°
Fig. 2B-1 Incoming Polarization (a) Side view (b) Top view (c) Polarization states in the case of switching from 1→1' when Faraday rotator rotates incoming polarization by 45° clockwise (viewing from right hand side of each component)

(d) Polarization states in the case of switching from 1→2' when Faraday rotator rotates incoming polarization by 45° counter-clockwise (viewing from right hand side of each component)

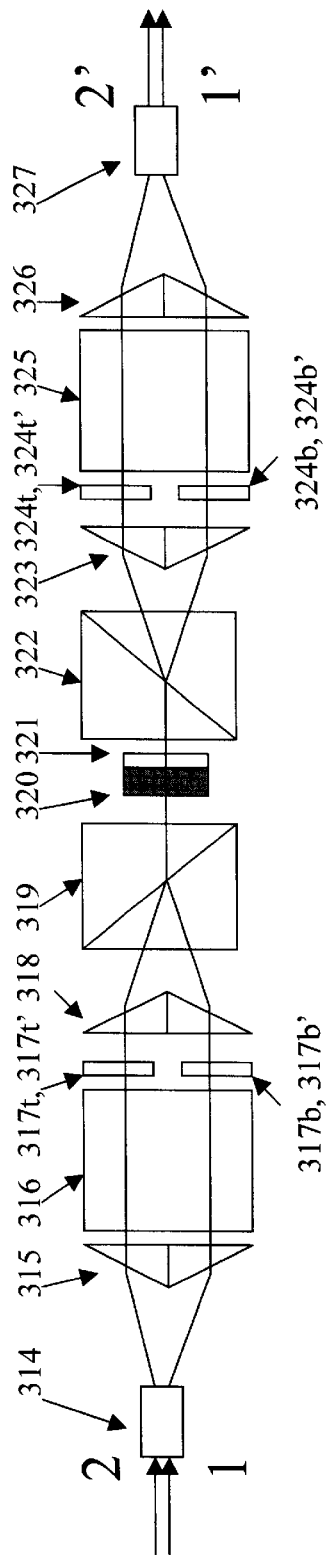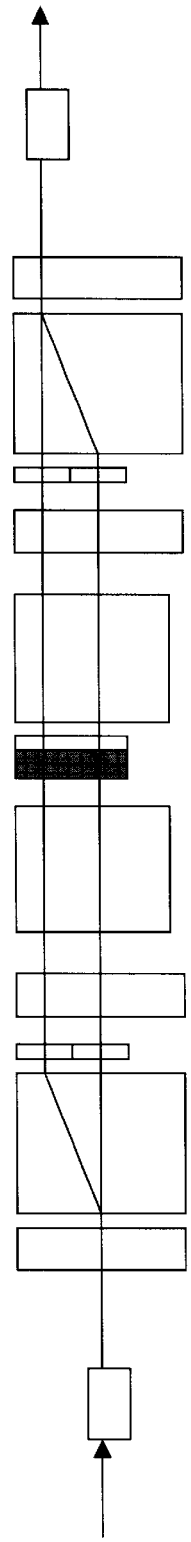
(a) Side view
Fig. 8A
(b) Top view
Fig. 8B (c) Polarization states in the case of switching from 1→2', 2→1' when Faraday rotator rotates incoming polarization by 45° clockwise. (viewing from right hand side of each component)

(d) Polarization states in the case of switching from 1→1', 2→2' when Faraday rotator rotates incoming polarization by 45° counter-clockwise. (viewing from right hand side of each component)

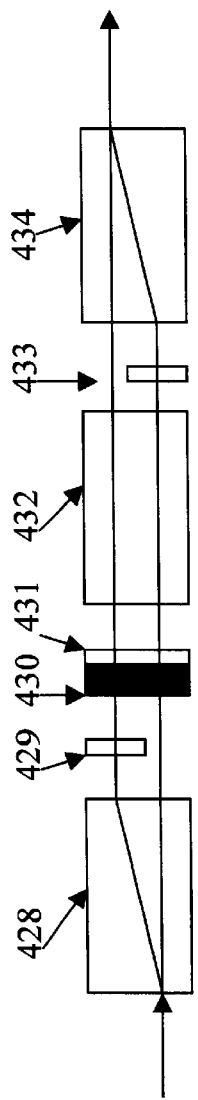
Fig. 9A (a) Side view
428,432,434: Birefringent crystals  429,431,433: Half waveplates  430: Faraday rotator
Fig. 9B (b) Top view
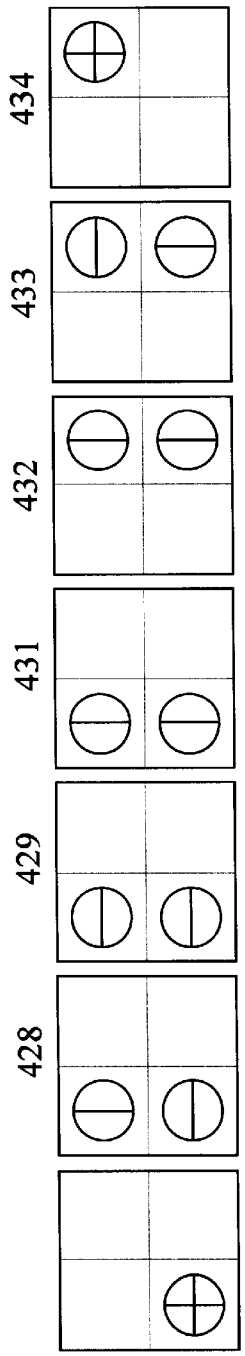
Fig. 9C (c) Polarization states in the case of switching from 1→1'. (viewing from right hand side of each component)

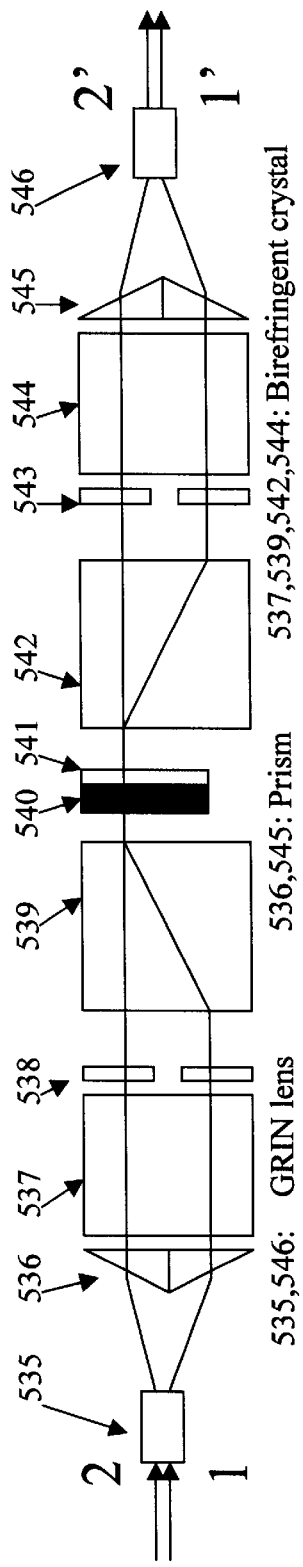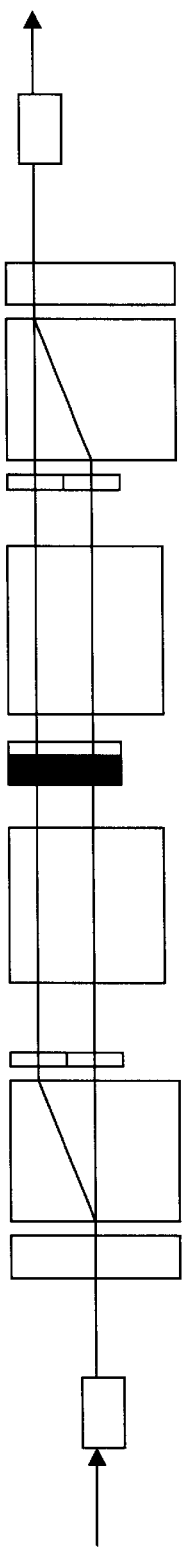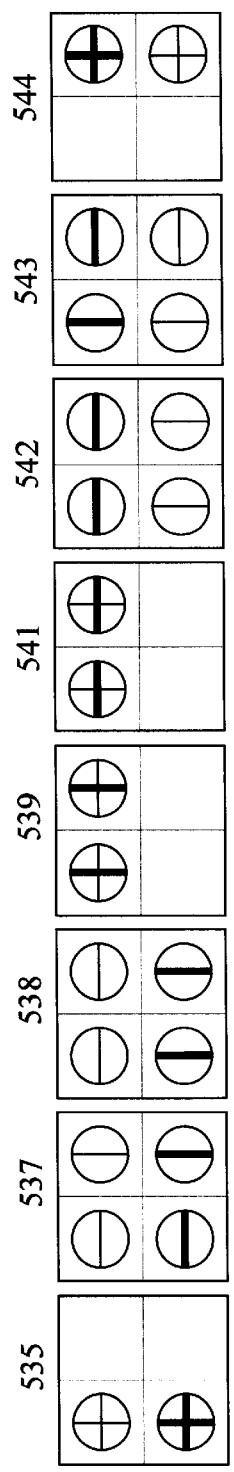
535, 546: GRIN lens  536, 545: Prism  537, 539, 542, 544: Birefringent crystal
538, 541, 543: Half waveplates  540: Faraday rotator
Fig. 10A (a) Side view
Fig. 10B (b) Top view
Fig. 10C (c) Polarization states in the case of switching from 1→2', 2→1'. (viewing from right hand side of each component)

HIGH SWITCHING SPEED DIGITAL FARADAY ROTATOR DEVICE AND OPTICAL SWITCHES CONTAINING THE SAME

This Application claims a priority date of Jul. 5, 2000 benefited from a previously filed Provisional Patent Application No. 60/216,056 filed on Jul. 5, 2000.

BACKGROUND OF THE INVENTION

1. Field of the Invention

The invention relates generally to method and apparatus for optical signal transmission. More particularly, this invention relates to bi-stable polarization control method and apparatus for configuring high-speed optical switches.

2. Descriptions of the Prior Art

As more fiber optic network systems are installed for carrying out optical signal transmissions, a technical challenge is still faced by those of ordinary skill to provide optical switches with high switching speed and long term operation reliability. An optical network system typically incorporates one or more switches to direct the optical paths for transmitting the optical signal to the desired destinations. In addition to the general requirements of low insertion loss, small cross talk, high extinction ratio, low polarization-dependent loss, etc., increasingly there is a demand for optical switches that have a high switching speed and good long-term reliability. The switching speed and reliability requirements are particularly important for optical network systems that demand high performance and long-term reliable signal transmissions.

Most optical switches implemented with prior art technology use mechanical switches, which utilize moving parts for controlling the optical signal transmission through different paths. Due to the need to mechanically move the optical element(s), switching speed is very limited, typically in millisecond range. Furthermore, the moving part is susceptible to material fatigue and worn out of linkages, particularly to these components connected to the moving parts. Long-term reliability becomes a major problem for design, operation, and maintenance of the optical network signal transmission systems as that discussed by P. G. Hale and R. Kompfner, in a paper "Mechanical Optical-Fiber Switch," *Electron. Lett.* 12, 388 (1976).

In order to overcome these difficulties, non-mechanical switches are implemented. The non-mechanical optical switches control the optical transmission paths of light by controlling the polarization state of a light by applying either magneto-optical or electro-optical control mechanism on the transmission of the light. In the case of using magneto-optic effect for controlling the switching operations, the typical device is composed of a soft Faraday rotator and an electromagnet. The magnetically soft Faraday rotator is located inside a cylindrical electromagnet that has coil windings around a soft magnet. Control of the magnetization state of the Faraday rotator is achieved by controlling the directions of the driving current in the coil. The drawback of this scheme is that it requires a continuous high current source to maintain the magnetization state in the Faraday rotator, resulting in high power consumption.

This problem can be alleviated by the more efficient, but sophisticated, electromagnet designs. Several prior art references discussed about these techniques. Specifically, in U.S. Pat. No. 5,048,937 entitled "Faraday Rotator Device and Optical Switch Containing same," was issued on Sep. 17, 1991 to Shigeru Takeda and Satoshi Makio. An article entitled "Non-mechanical optical switch for single-mode fibers" was published in *Applied Optics*, Vol. 21, No.23, 4229–4234, 1982 by M. Shirasaki, H. Nakajima, T. Obokata, and K. Asama. Another article entitled "Magneto-optical 2×2 switch for single-mode fibers," was published in *Applied Optics*, Vol.23, No.19, 3272–3276, 1984, by M. Shirasaki, F. Wada, H. Takainatsu, H Nakajima, and K. Asama. Furthermore, a different electromagnet using semi-hard magnetic core material instead of the conventional soft magnets combining with a driving current pulse with finite time duration reduces the need for a continuous power supply. However, the material properties of the semi-hard magnet has to be carefully optimized so that it is not too hard to drive, yet hard enough to sustain the required remnant state. Specific details can be referred to U.S. Pat. No. 5,627,924, entitled "Article Comprising a non-mechanical optical fiber switch," issued on May 6, 1997 to S. Jin, I. Royer and T Tiefel. These devices however require complicated electromagnet design. Additionally, the devices are more expensive because sophisticated magnet with optimized material property has to be used.

Therefore, a need still exists in the art to provide a simple and compact switching device with high switching speed and long term reliability without requiring complicated electromagnets design and expensive materials such that these limitations and difficulties can be resolved. The key to the current invention is the utilization of a semi-hard or hard magneto-optical crystal in the Faraday rotator instead of the soft magneto-optical crystal used in the prior arts. This eliminates the need for both a continuous current source and various complicated electromagnets designs.

SUMMARY OF THE PRESENT INVENTION

It is the object of the present invention to provide a compact, non-mechanical, non-blocking and high speed optical switch.

A preferred embodiment of this invention discloses a basic digital Faraday rotator device that comprises (a) a semi-hard or hard magneto-optic iron garnet-based crystal having bi-stable magnetization states at zero external magnetic field. (b) a wire winding around the crystal for changing the magnetization states by pulsed current having both fast rise time and short duration. (c) a circuit generating the required current pulses with both polarities. After a driving current pulse excitation to set the magnetization direction, the high coercive force and high remnant squareness in the garnet-based crystal will maintain the saturation magnetization state in the crystal without the need of any external current or magnetic field to sustain the remnant state.

The charging and discharging circuit through a capacitor controls the polarity of the driving current pulses and that controls the states of magnetization and polarization. The configuration significantly simplifies the circuit design. The current pulse is programmable and can also be controlled remotely.

The invention also includes several designs of 1×2 and 2×2 optical switches which can be constructed by different combinations of birefringent crystals, waveplates, GRIN lens, prisms, Wollaston prisms and the above mentioned digital Faraday rotator devices. The detailed optical schematics are described in the following sections.

These and other objects and advantages of the present invention will no doubt become obvious to those of ordinary skill in the art after having read the following detailed descriptions of the preferred embodiment that is illustrated in the various drawing figures.

BRIEF DESCRIPTION OF THE DRAWINGS

FIGS. 1A and 1B are block diagrams of a digital Faraday rotator device structure and the polarization state changes of the light beam;

FIGS. 2A-1 to 2B-3 are polarization states of the light beam after each component with changes of rotator's magnetization states;

FIG. 3 Hysteresis loop of the Faraday rotator having bi-stable magnetization states at zero magnetic field.

FIGS. 8a and 8b are respectively side view and top view of the schematic diagrams of a polarization independent 2×2 optical switch using Wollaston prism.

FIGS. 9A to 9C are schematic diagram of a polarization independent 1×2 optical switch using only birefringent crystals for beam separation and combination: (a) Side view, (b) top view, (c) Polarization states in the case of switching from 401→402' in viewing the right hand side of each component).

FIGS. 10A to 10C are schematic diagrams of a polarization independent 2×2 optical switch using only birefringent crystals for beam separation and combination: (a) Side view, (b) Top view, (c) Polarization states in the case of switching from 501→502' and 502→501' (viewing from the right hand side of each component).

DETAILED DESCRIPTION OF THE METHOD

Figure 3:
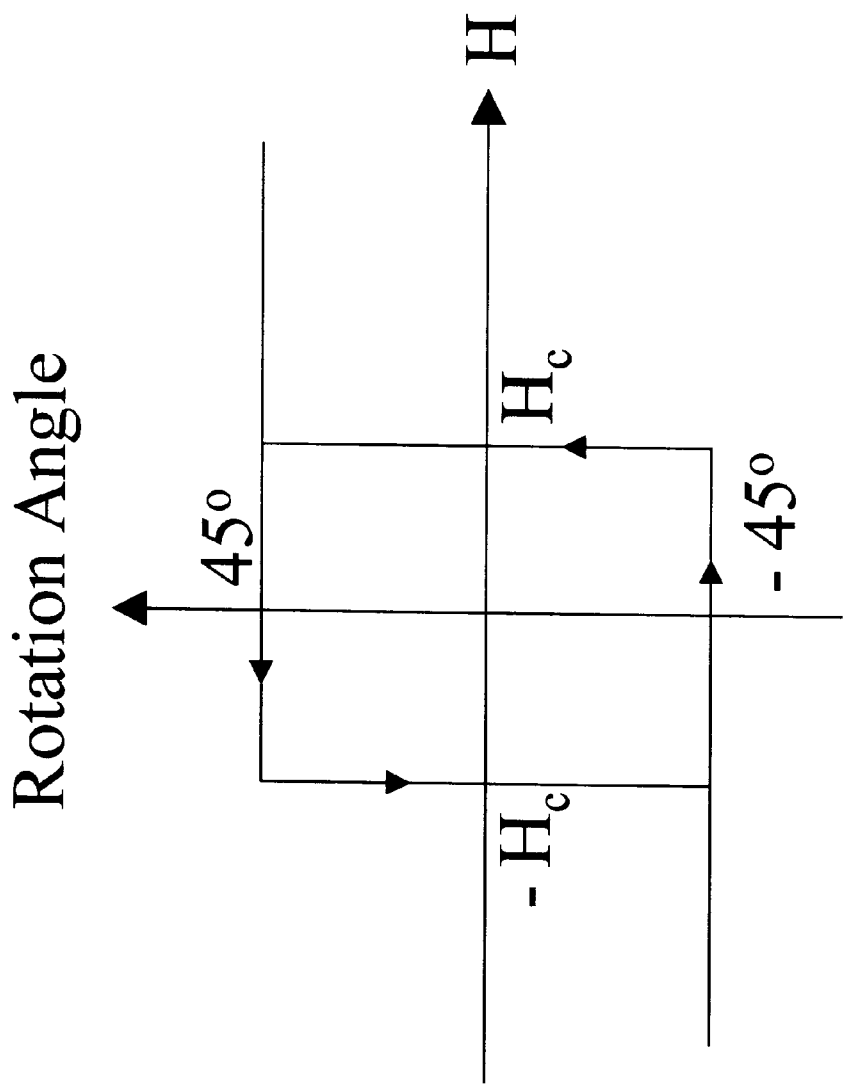

Referring to FIGS. 1A and 1B, for the basic digital Faraday rotator device of this invention. The Faraday rotator 100 is composed of a semi-hard or hard magneto-optic garnet-based crystal 105 having bi- stable magnetization states at zero external magnetic field and a wire winding 110 around the crystal for changing the magnetization states. An example of the garnet crystal is the well-known Bi- and Al-substituted iron garnet as published in the article "Magnetic and Magneto-optic Properties of Bismuth- and Aluminum-substituted Iron Garnet Films", *Journal of Applied Physics*, Vol. 55, No.4, pp: 1052–1061, Feb., 1984. Referring to FIGS. 2A and 2B for a function of controlling the polarization states. As shown in FIGS. 2A-1 and FIG. 2A-2, at one specific magnetization state, the Faraday rotator 100 rotates the polarization 120 of the incoming light by forty-five degrees clockwise. After passing through a half wave-plate (HWP) 115 with its optical axis 125 at 22.5 degrees as shown in FIG. 2A-3, the polarization angle 130 rotates back to the original state. In FIGS. 2B-1 and 2B-2, the magnetization in the Faraday rotator crystal 105 is changed into an opposite saturation-state by a current pulse in the coil 110. The polarization 120 rotates forty-five degrees counter-clockwise after the rotator as shown in FIG. 2B-2. The half-wave plate 115, then, further rotates the polarization into a ninety-degree angle, and the polarization 140 is orthogonal to the previous case represented by the dot 140 in FIG. 1B.

Figure 4:
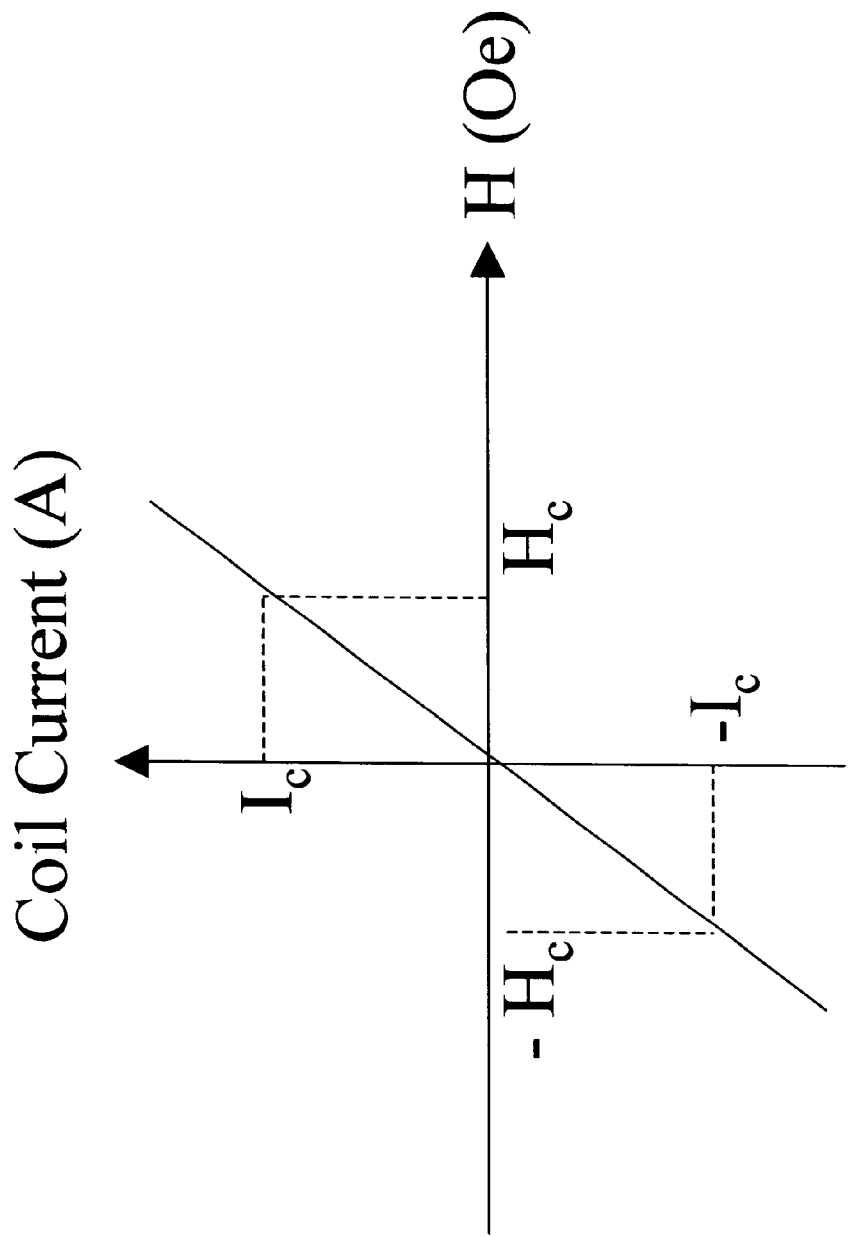
FIG. 4: Relationship between the driving current pulse amplitude and the magnetic field generated from the coil.
Figure 5:
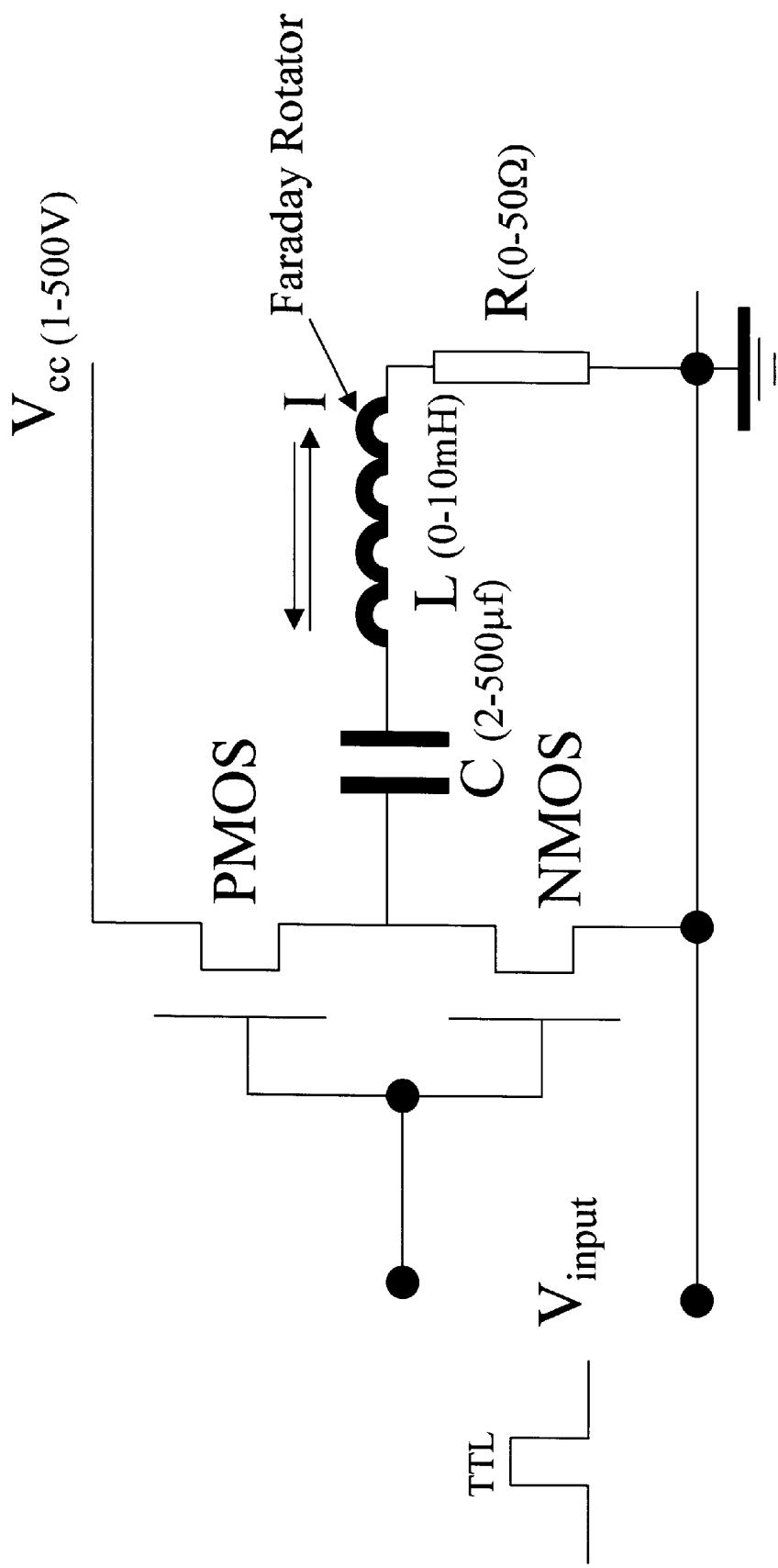
FIG. 5: Circuit of current pulse generator.
Figure 6:
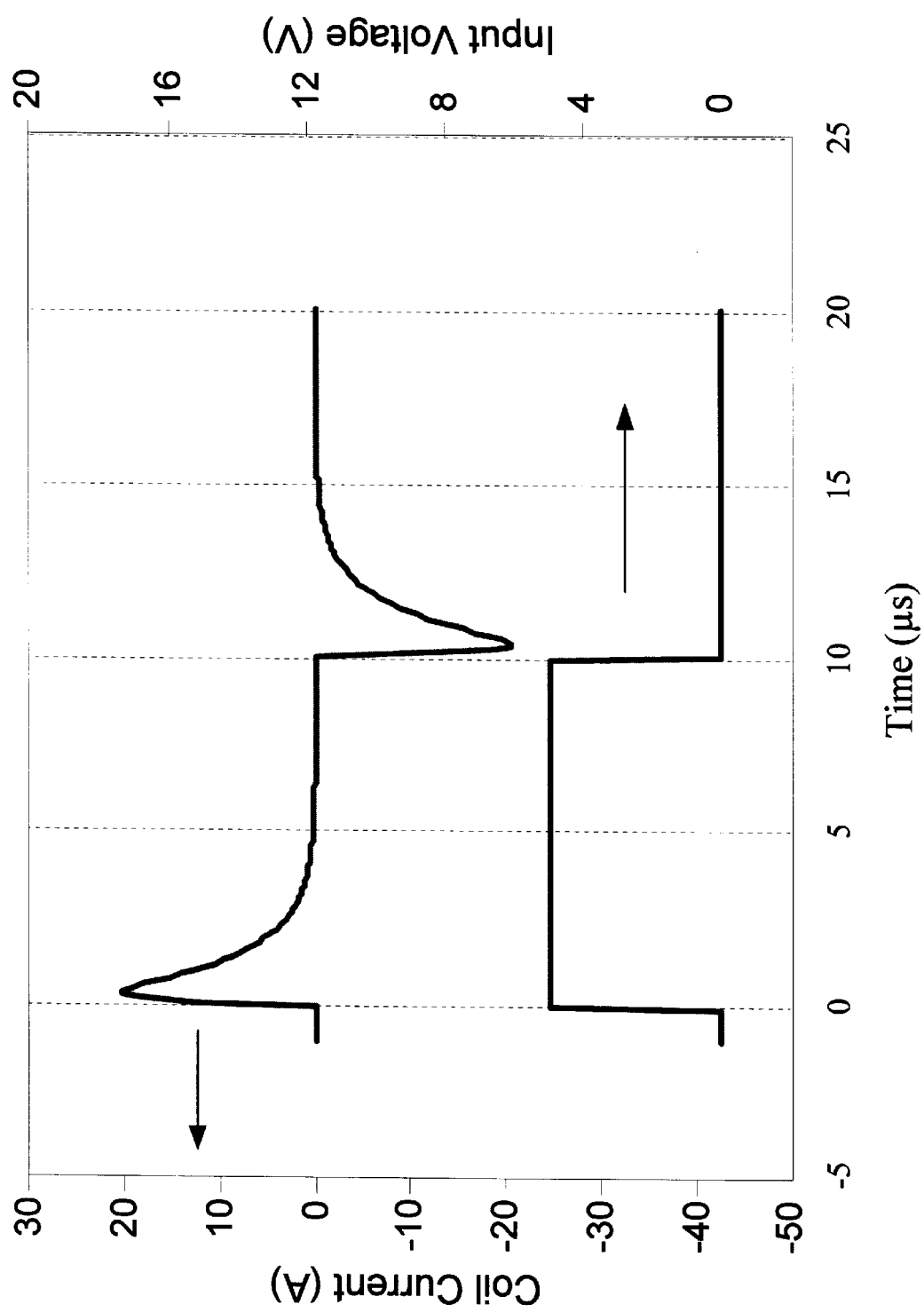
FIG. 6: Current pulse waveform relative to the on/off switching timing signal.

In order to sustain the magnetization states without any help from either external field or continuous current source in the driving coil, the Faraday rotator crystal 105 is required to have a square hysteresis and a reasonably large coercivity, typically higher than 10 Oe for example, as shown in FIG. 3. In order to change the magnetization state, a high enough driving current exceeding the coercivity level is needed as shown in FIG. 4. To accomplish this, a fast rise time and a pulse of high peak-current must be generated using the circuit shown in FIG. 5. The positive polarity of the current pulse is generated by the capacitor charging process, and the discharging of the capacitor generates a current of a negative-polarity. A circuit shown in FIG. 5 provides a sub-micro second rise time and a level of 20 amperes peak-current with V=18V, C=18 $\mu$f, R=0.3$\Omega$, L=200 nH. A typical pulse waveform relative to the on/off switching timing signal is shown in FIG. 6. In order to change the magnetization state in the Faraday rotator 105, many different types of driving coil designs, including electromagnet, can be used to generate the required magnetic field. However, they do not deviate from the design concept of the current digital Faraday rotator device.

Implemented with above-mentioned digital Faraday rotator, several optical switches are designed and disclosed in this invention. These switch designs are not limited to the digital Faraday rotator device only. Any devices capable of changing the polarization state of the light can be used to replace the digital Faraday rotator device without changing the following optical switch design concept.

Figure 7A:
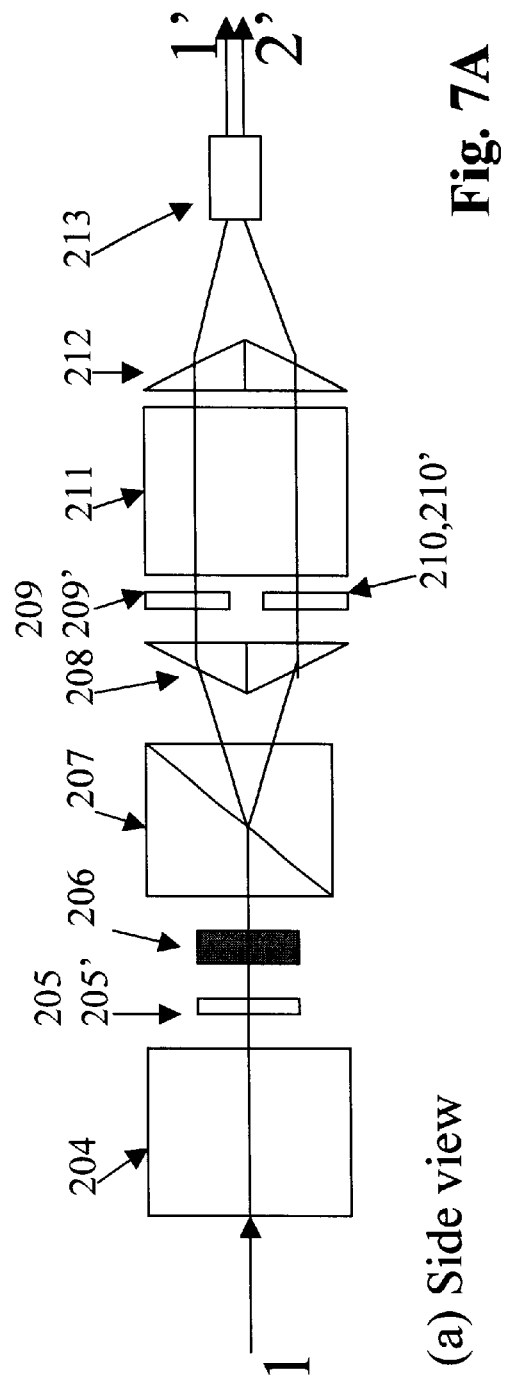
FIGS. 7a and 7b are respectively side view and top view of the schematic diagrams of a polarization independent 1×2 optical switch using Wollaston prism.
Figure 7B:
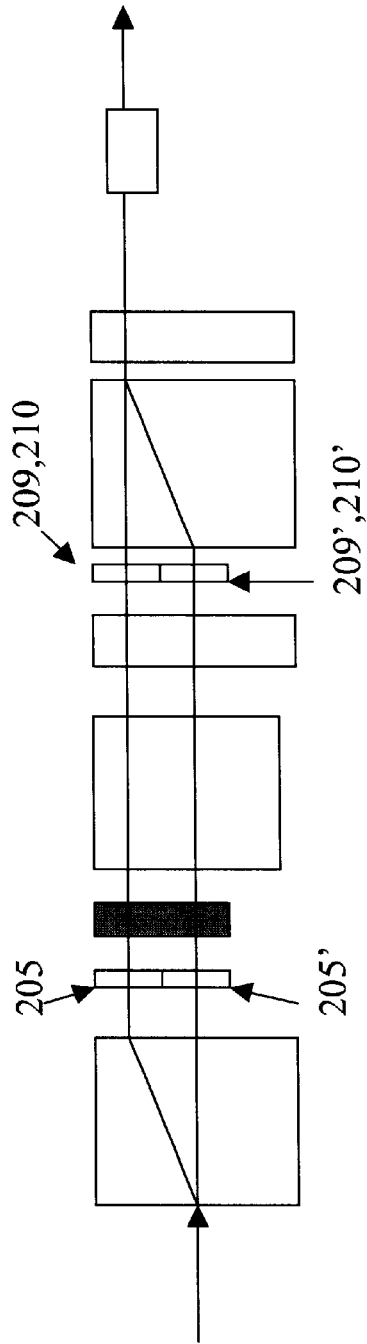
Figure 7C:
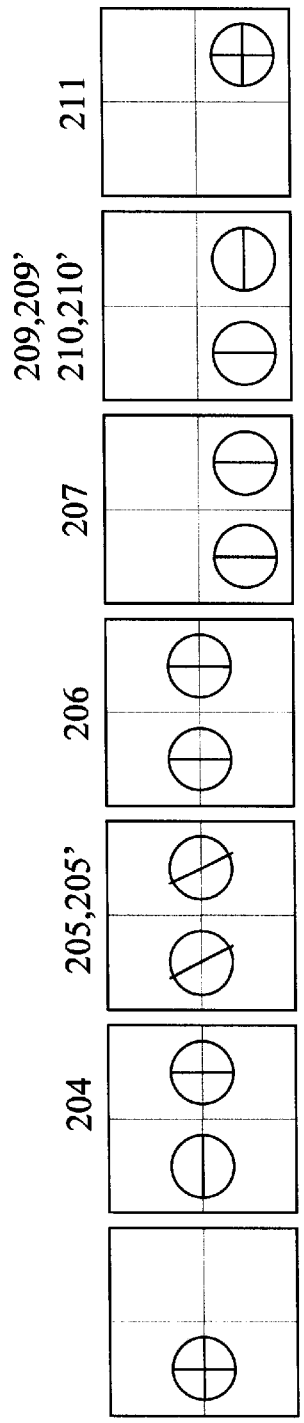
FIGS. 7c and 7d are respectively schematic diagrams for showing the polarization states the switch of FIG. 7(a) when Faraday rotator rotates incoming polarization by 45° clockwise and when Faraday rotator rotates incoming polarization by 45° counter-clockwise.
Figure 7D:
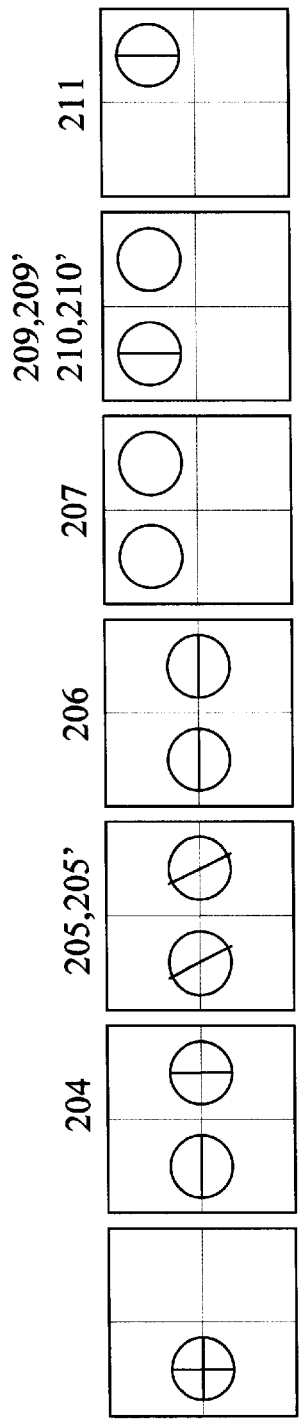

The basic concept of a polarization independent 1×2 optical switch is shown in FIGS. 7A and 7B as a cross sectional view and a top view respectively. Referring also to FIGS. 7C and 7D for polarization state changes as the beam passes through different components shown in FIGS. 7A and 7B when the Faraday rotator 206 is at two different magnetization states as discussed above. First, the light coming out of the fiber end is collimated using a GRIN lens (not shown). Then, the collimated light 201 passes through a birefringent crystal 204. The birefringent crystal 204 is used to split the incoming light into extraordinary (e) and ordinary (o) polarization beams as shown in FIG. 7B. Next a pair of wave plates 205 and 205' are used to modify the beams so that both beams have the same polarization at forty-five degrees with respect to the vertical axis as shown in FIGS. 7C and 7D. These two beams are then passed through the digital Faraday rotator device 206. The states of polarization (SOP) for both beams are rotated either −45 degrees or +45 degrees depending upon the magnetization state of the Faraday rotator 206. Subsequently, the light coming out of the Faraday rotator 206 passes through a Wollaston prism 207. The e and o beam components exit the Wollaston prism at two different directions as shown in FIGS. 7C and 7D. A prism 208 is designed to collimate the beams from Wallaston prism into parallel beams. A group of wave-plates 209, 209', 210, 210' and a birefringent crystal 211 are then used to combine the two previously separated polarized components into one beam. This way, the intensity of the exiting light is restored to the original level of the incoming light. The prism wedges 212 are used to adjust the angles of the outgoing lights to match up with the two respective dual fiber inputs in the GRIN lens 213. The polarization state changes after each component are plotted in FIGS. 7C and 7D. The states of polarization (SOP) are shown for cases where the switching is from the incoming port 201 to the exit port 201' and from port 201 to port 202', respectively, depending on the magnetization state of the Faraday rotator 206.

Figure 8C:
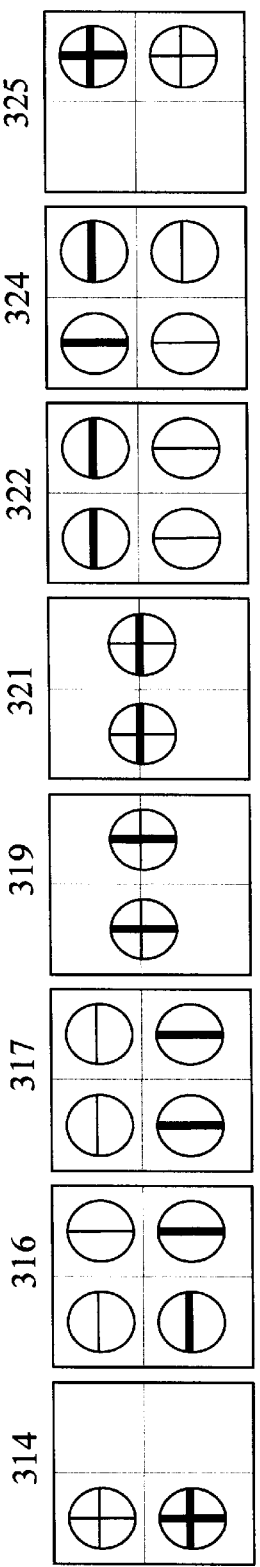
FIGS. 8c and 8d are respectively schematic diagrams for showing the polarization states the switch of FIG. 8(a) when Faraday rotator rotates incoming polarization by 45° clockwise and when Faraday rotator rotates incoming polarization by 45° counter-clockwise.
Figure 8D:
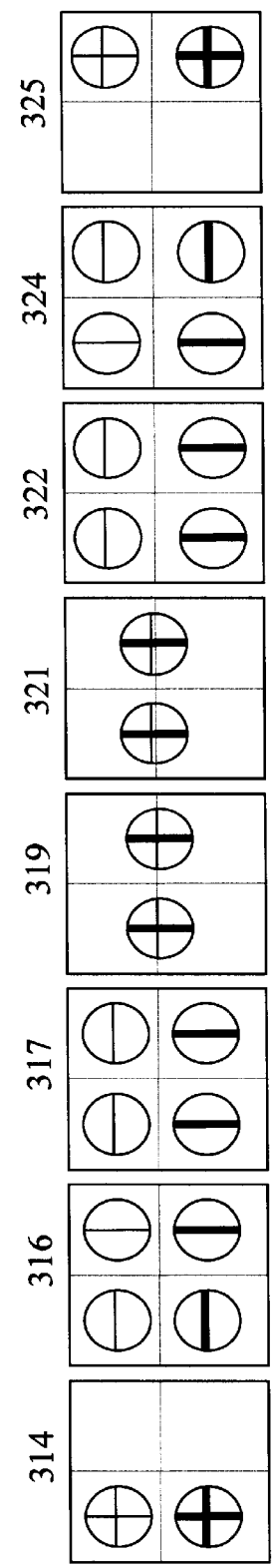

The concept of the above 1×2 switch can be further extended to construct the more sophisticated polarization independent 2×2 switch. Referring to FIGS. 8A and 8B for a side cross sectional view and a top view of a 2×2 switch. Two incoming lights are aligned in the vertical plane and received by the input ports 301 and 302, and the spacing between the two is increased by a GRIN lens 314 and collimated by a prism 315 as shown in FIG. 8A. Both of these two light beams are then split into an extraordinary e-component and ordinary o-component in the transverse direction by a birefringent crystal 316. Two wave plates 317t', 317b and two optical path compensation plates 317t, 317b' are then used to modify the polarization so that the upper two beams have the same polarization, but orthogonal to that of the bottom two beams as that shown in FIG. 8C. All beams are then passed through a prism 318 and merged vertically by a Wollaston prism 319 as shown in FIGS. 8A and 8C. Then, these beams are transmitted through the digital Faraday rotator device 320, half waveplate 321, and, subsequently, a second Wollaston prism 322. Depending upon the magnetization state in the Faraday rotator, the polarization either remains the same or is rotated by 90-degrees. The second Wollaston prism 323 is used to separate the e and o beams. If the polarization is rotated 90-degrees by the Faraday rotator device 320, the bottom two beams will switch to the top two quadrants and the top two beams will switch to the bottom two quadrants as shown in FIG. 8C. If the polarization remains the same instead, top beams stay in top quadrants and bottom beams stay in bottom quadrants as that shown in FIG. 8D. Finally, a combination of prisms 323 and 326, waveplates 324t', 324b', compensation plates 324t', 324b and a birefringent crystal 325 are then used to combine the top two beams and the bottom two beams, respectively. The two beams are then sent to the separate exit ports through a prism wedge 326 to adjust the angle of the outgoing light beams to match up with the two respective dual fiber inputs in the GRIN lens 327. The polarization state changes after each component are shown in FIGS. 8C and 8D. FIG. 8C shows the polarization state changes for the case where the incoming lights are switched from input port 301 to output port 302', and from input port 302 to exit port 301'. FIG. 8D shows the polarization state for the case where the incoming lights are switched from input port 301 to output port 301', and from input port 302 to exit port 302'. A high speed switching operation is achieved by simply changing the magnetization state of the Faraday rotator 320. Birefringent crystals may be used to replace either one or both Wollanston prisms used in FIGS. 7 and 8 for the 1×2 and 2×2 switches as shown in FIGS. 9 and 10. The sequence of light transmissions through different optical components and the changes of polarization states are very similar to that shown and described in FIGS. 7 and 8.

Referring to FIGS. 9A to 9C for another preferred embodiment of a polarization independent 1×2 optical switch using a birefringent crystal, instead of Wallanston prisms. FIGS. 9A and 9B are a cross sectional view and a top view, respectively, and FIG. 9C shows the polarization state changes as the beam passes through different components as that shown in FIGS. 9A and 9B when transmitting light from port 401 to 401' in this case. The magnetization state of the Faraday rotator 430 can also be switched to transmit the incoming light beam from the input port 401 to the output port 402' (not shown). First, the light coming out of the fiber end is collimated using a GRIN lens (not shown). Then, the collimated light reaches the input port 401 and pass through a birefringent crystal 428. The birefringent crystal 428 splits the incoming light into extraordinary (e) and ordinary (o) polarization beams as shown in FIG. 9B. Next a half wave plate 429 is used to modify the beams so that both beams have the same polarization as shown in FIG. 9C. These two beams are then passed through the digital Faraday rotator device 430 and another half wave plate 431. The states of polarization (SOP) of both beams are either rotated by 90-degrees or remain the same depending upon the magnetization state of the Faraday rotator 430. FIG. 9C shows a case where the states of the polarization of the beams are rotated by 90-degrees. Subsequently, the light coming out of the half wave plate 431 passes through a birefringent crystal 432. The two beams exiting the birefringent crystal 432 are shifted to the first and the forth quadrants as shown in FIG. 9C. Another half wave plate 433 is used to rotate the polarization of one of the beams on the first quadrant by 90-degrees. Then, a birefringent crystal 434 combines these two components into one light beam and finally transmits the light to output port 401'. This way, the intensity of the exiting light is restored to the original level of the incoming light. Based on the same sequence of beam transmissions and processes, the input beam can also be transmitted from port 401 to another output port 402' by changing the magnetization state of the Faraday rotator 430 to another bi-stable state.

Referring to FIGS. 10A and 10B for a side cross sectional view and a top view, respectively, of a 2×2 switch follows the similar configuration as shown in FIGS. 8A to 8D. Two incoming lights are aligned in the vertical plane received by the input ports 501 and 502. The spacing between the two is increased by a GRIN lens 535 and collimated by a prism 536 as shown in FIG. 10A. Both of these two light beams are then split into e and o components in the transverse direction by a birefringent crystal 537. Two half wave plates 538 are then used to rotate the beam polarization so that the upper two beams have the same polarization while the lower two beams also have the same polarization but orthogonal to that of the top two beams as that shown in FIG. 10C. All beams are then passed through a birefringent crystal 539 and merged vertically to pass through top two quadrants as shown in FIGS. 10A and 10C. Then, these beams are transmitted through the digital Faraday rotator device 540 and a half-wave plate 541. Depending upon the magnetization state in the Faraday rotator, the polarization either remains the same or is rotated by 90-degrees. Another birefringent crystal 542 is used to separate the e and o beams. If the polarization is rotated 90-degrees by the Faraday rotator device 540, the bottom two beams will switch to the top two quadrants and the top two beams will switch to the bottom two quadrants as shown in FIG. 10C. If the polarization remains the same instead, top beams stay in top quadrants and bottom beams stay in bottom quadrants as that shown in FIG. 8D. Finally, a combination of waveplates 543 and a birefringent crystal 544 are then used to combine the top two beams and the bottom two beams, respectively. The two beams are then sent to the separate exit ports through a prism wedge 545 to adjust the angle of the outgoing light beams to match up with the two respective dual fiber inputs in the GRIN lens 546. FIG. 10C shows the polarization state changes for the case where the incoming lights are switched from input port 501 to output port 502', and from input port 502 to exit port 501'. A high speed switching operation is achieved by simply changing the magnetization state of the Faraday rotator 540. Birefringent crystals are used in this embodiment to replace the Wollanston prisms used in FIGS. 8A and 8B for the 2×2 switch.

Although the present invention has been described in terms of the presently preferred embodiment, it is to be understood that such disclosure is not to be interpreted as the limit. Various alterations and modifications will no doubt become apparent to those skilled in the art after reading the above disclosure. Accordingly, it is intended that the appended claims be interpreted as covering all alterations and modifications as fall within the true spirit and scope of the invention.

I claim:

1. An optical Faraday rotator comprising:

an iron-garnet based magneto-optic crystal for transmitting a light beam therethrough wherein said magneto-optic crystal having bi-stable magnetization states with hysteresis coercivity greater than 10 Oe;

a switching device comprising coil windings around said magneto-optic crystals;

a switching circuit connected to said switching device wherein said switching circuit includes a pulse current generating means having a capacitor for generating a pulsed current of a first polarity in charging said capacitor and a pulsed current of a second polarity opposite the first polarity in discharging from said capacitor for providing a pulse current with rapid rise and fall time;

said pulsed current of said first and second polarities are converted by said switching device into magnetic field of a corresponding first and second polarities for switching the saturated bi-stable magnetization state of said magneto-optic crystal; and said magneto-optic crystal is provided for rotating a polarization of said light beam transmitted therethrough depending on said saturated bi-stable magnetization state of said semi-hard or hard magneto-optic crystal.

2. An optical Faraday rotator comprising:

a magneto-optic crystal for transmitting a light beam therethrough;

a switching device disposed near said magneto-optic crystal for providing a pulsed electromagnetic signal with rapid rise time for switching a saturated bi-stable magnetization state of said magneto-optic crystal; and said magneto-optic crystal is provided for rotating a polarization of said light beam transmitted therethrough depending on said saturated bi-stable magnetization state of said magneto-optic crystal under a condition of substantially zero external field.

3. The optical Faraday rotator of claim 2 wherein:

said magneto-optic crystal is an iron garnet based crystal.

4. The optical Faraday rotator of claim 2 wherein:

said magneto-optic crystal is provided for rotating the polarization of said light beam transmitted therethrough.

5. The optical Faraday rotator of claim 2 wherein:

said switching device comprising a means for converting an electrical current into a magnetic field.

6. The optical Faraday rotator of claim 5 wherein:

said switching device comprising coil windings around said magneto-optical crystal.

7. The optical Faraday rotator of claim 2 wherein:

said switching circuit further comprising a pulse current generating means for generating a pulsed current with rapid rise and fall time for switching said magnetization state of said magneto-optic crystal.

8. The optical Faraday rotator of claim 7 wherein:

said pulse current generating means having a capacitor for generating a pulsed current of a first polarity in charging said capacitor and a pulsed current of a second polarity opposite the first polarity in discharging from said capacitor.

9. The optical Faraday rotator of claim 2 wherein:

said magneto-optic crystal having a hysteresis coercivity greater than 10 Oe.

10. A method for rotating a polarization of an optical beam comprising:

transmitting said optical beam through a magneto-optic crystal and adjusting the bi-stable magnetization state of said magneto-optic crystal for rotating a polarization of said optical beam;

disposing a switching device having a switching circuit near said magneto-optic crystal for providing a pulsed electrical current with rapid rise and fall time for generating a short magnetic field pulse for switching a bi-stable magnetization state of said magneto-optic crystal.

11. The method of claim 10 wherein:

said step of providing a pulsed electrical current with rapid rise and fall time comprising a step of providing a pulse current with sub-micro second rise time having a peak current ranging between 10 milli-amperes to 500 amperes.

12. The method of claim 10 further wherein:

said step of transmitting said optical beam through a magneto-optic crystal comprising a step of transmitting said optical beam through said magneto-optic crystal having a hysteresis coercivity greater than 10 Oe.

13. An optical switch comprising:

a Faraday rotator comprising a magneto-optic crystal for transmitting a light beam therethrough;

said Faraday rotator further includes a switching device disposed near said magneto-optic crystal for providing a pulsed electromagnetic signal with rapid rise and fall time for switching a saturated bi-stable magnetization state of said magnetic crystal; and said magneto-optic crystal is provided for rotating a polarization of said light beam transmitted therethrough depending on said saturated bi-stable magnetization state of said magneto-optic crystal under a condition of substantially zero external field.

14. The optical switch of claim 13 further comprising:

a single input fiber collimator for collimating a light beam incident to said optical switch and a dual-fiber collimator having a first and second output fibers for providing a dual-port optical output from said optical switch wherein said Faraday rotator controlling said polarization of said light beam for switching said light beam to transmit from said input collimator to one of said first and second output fibers.

15. The optical switch of claim 13 further comprising:

an input dual-fiber collimator having a first and second input fibers for collimating a first light beam and a second light beam incident to said optical switch and an output dual-fiber collimator having a first and second output fibers for providing a dual-port optical output from said optical switch wherein said Faraday rotator controlling said polarization of said first and second light beams for controlling a transmission of said first light beam from either said first or said second output fiber and said second light beam from another output fiber.

16. A two-by-two optical switch for switching the first input beam to one of the two output ports and the second input beam to the other output port comprising:

a first optical means for separating said first and second input beams into respectively an extraordinary e1-componsnt and e2-component, and respectively an ordinary o1-component and o2-component wherein each of said extraordinary e-components being orthogonal to said ordinary o-components, and said first optical means further rotates the e1-component and the o2-component by 90-degrees and convert them into ordinary o'1-component and extraordinary e'2-component, respectively, and said first optical means eventually crossly merging said o1-component with said e'2-component as a first merged light and said o'1-component with said e2-component as a second merged light;

an adjustable polarization rotation means for adjusting the polarization state of said first and second merged light to generate a first polarization-adjusted merged light and a second polarization-adjusted merged light;

a second optical means for separating said first and second polarization-adjusted merged lights into either separated o1, o'1, e2, and e'2 components or separated e1, e'1, o2, and o'2 components depending upon the magnetization state of the Faraday rotator, and said optical means further rotates o1 and e2 into e'1 and o'2, respectively, or rotates e1 and o2 into o'1 and e'2 depending upon the magnetization state of the Faraday rotator, and eventually said second optical means merges said o'1 with said e'1 and said o'2 with said e'2 and then transmits them into first and second output ports wherein the transmission of the merged output lights into said first and second output ports are adjustable depending upon said polarization state of said first and second merged light as adjusted by said adjustable polarization rotation means.

17. The two-by-two optical switch of claim 16 wherein:
said adjustable polarization rotation means comprising a Faraday rotator comprising a semi-hard or hard magneto-optic crystal for transmitting a light beam therethrough.

18. The two-by-two optical switch of claim 16 wherein:
said first optical means for separating said first and a second beams into respectively an extraordinary e1-componsnt and e2-component, and respectively an ordinary o1-component and o2-component further including a birefringent crystal.

19. The two-by-two optical switch of claim 16 wherein:
said first optical means for rotating the e1-component and the o2-component by 90-degrees further including half waveplates.

20. The two-by-two optical switch of claim 16 wherein:
said first optical means for crossly merging said o1-component with said e2-component as a first merged light and said o2-component with said e1-component as a second merged light further comprising a Wollaston prism.

21. The two-by-two optical switch of claim 16 wherein:
said first optical means for crossly merging said o1-component with said e2-component as a first merged light and said o2-component with said e1-component as a second merged light further comprising a birefringent crystal.

22. The two-by-two optical switch of claim 16 wherein:
said second optical means having a functionality substantially mirror symmetrical to said first optical means.

23. A one-by-two optical switch for transmitting an input light to either the first or the second output port comprising:

a first optical means for separating said input light into mutually orthogonal extraordinary e-component and ordinary o-component, and said first optical means further rotates the polarization angle from one of the two components by 90-degrees to align the two components into the same polarization state;

an adjustable polarization rotation means for adjusting the polarization angle of said aligned components for generating a set of aligned polarization-adjusted components;

a second optical means for providing two alternative paths for the set of aligned polarization-adjusted components depending upon the polarization state of the aligned polarization-adjusted components;

a third optical means for rotating the polarization angle by 90-degrees from one of said aligned polarization-adjusted components for producing mutually orthogonal output o-component and output e-component and for combining said output o-component with said output e-component as an output light for transmitting into either the first or the second output ports wherein the transmission of said output light to said first or second output ports are adjustable depending upon said polarization rotation made to said aligned polarization-adjusted components by said adjustable polarization rotation means.

24. The one-by-two optical switch of claim 23 wherein:
said adjustable polarization rotation means comprising a Faraday rotator wherein said Faraday rotator further comprises a semi-hard or hard magneto-optic crystal for transmitting a light beam therethrough.

25. The one-by-two optical switch of claim 23 wherein:
said first optical means for separating said input light into mutually orthogonal extraordinary e-component and an ordinary o-component further including a birefringent crystal.

26. The one-by-two optical switch of claim 23 wherein:
said second optical means for providing two alternative paths for the set of aligned polarization-adjusted components further including Wollaston prism.

27. The one-by-two optical switch of claim 23 wherein:
said second optical means for providing two alternative paths for the set of aligned polarization-adjusted components further including birefringent crystal.

28. The one-by-two optical switch of claim 23 wherein:
said third optical means for modifying the polarization-state of said e-component and said o-component and for recombining the two components further comprising half waveplates for polarization adjustment and birefringent crystals for beam recombination.

* * * * *